UNITED STATES PATENT OFFICE.

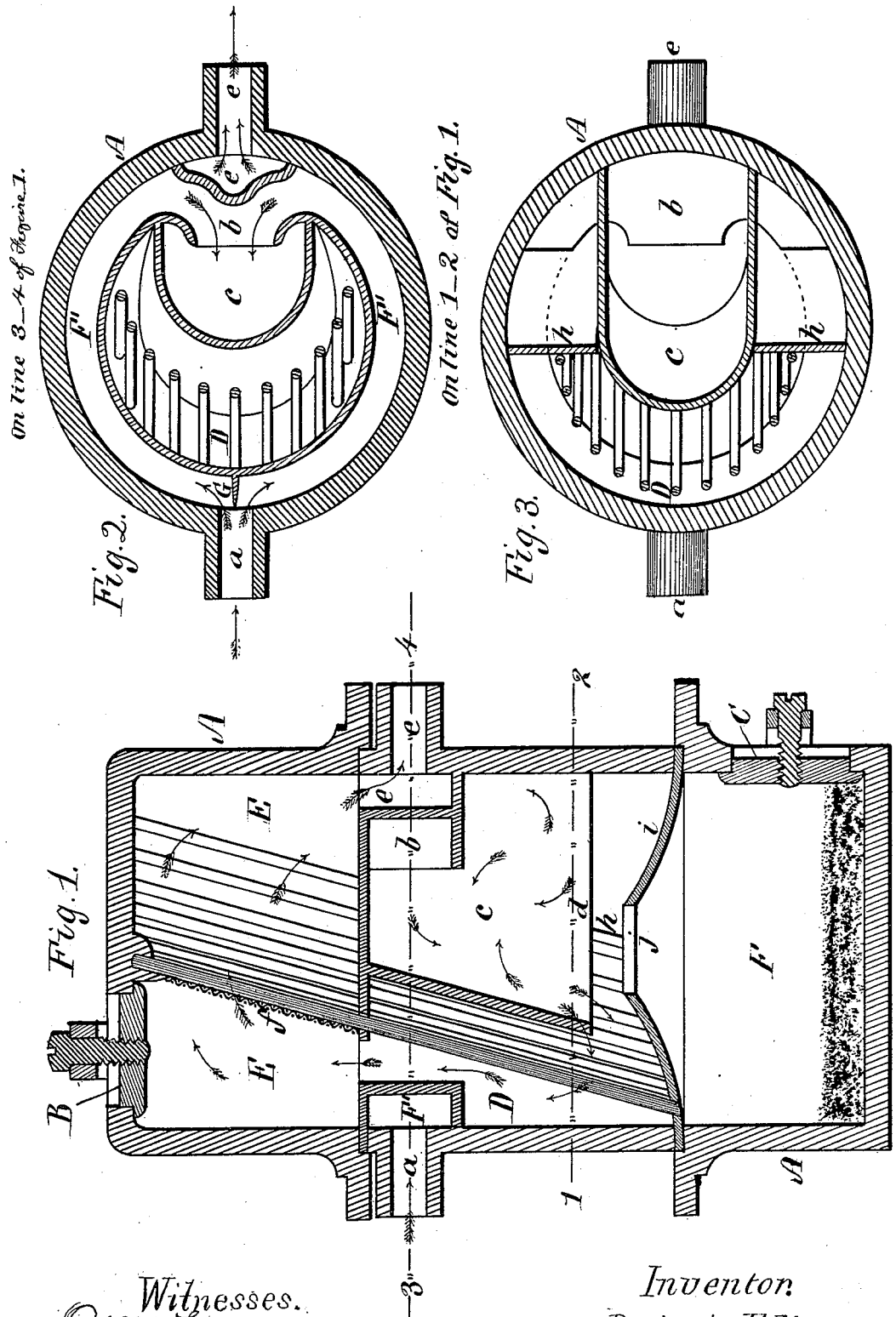

BENJAMIN F. NOURSE, OF BOSTON, MASSACHUSETTS.

SEDIMENT-TRAP FOR PURIFYING LIQUIDS.

SPECIFICATION forming part of Letters Patent No. 245,550, dated August 9, 1881.

Application filed December 3, 1880. (No model.)

*To all whom it may concern:*

Be it known that I, BENJAMIN F. NOURSE, a citizen of the United States, residing at Boston, in the county of Suffolk, State of Massachusetts, have invented certain new and useful Improvements in Sediment-Traps; and I do hereby declare the following to be a full, clear, and exact description of the invention, such as will enable others skilled in the art to which it appertains to make and use the same.

This invention relates to means for purifying water or other liquids in motion and under pressure by the employment of means for arresting and depositing the sedimentary matters contained in such liquid by the well-known natural process of sedimentary deposit due to the action of an eddy produced by cross or conflicting currents, and supplementing the action of gravitation.

In carrying out my invention in one practical form of embodiment of which it is susceptible, I employ a close vessel having an inlet-port to admit of entrance of fluid to it and an outlet-port to permit of escape of such fluid from it, and I construct the interior of this vessel in such manner that the fluid upon entering it is diverted into different channels, which subsequently meet, or otherwise so governed or controlled in its passage through the vessel as to produce an eddy to accelerate the precipitation of matter or particles held in suspension by the liquid in motion, and having greater specific gravity than the latter, as well as to retard the velocity of the current to such an extent as to allow the sediment to deposit itself in a suitable receptacle, as the best results are obtained from the minimum of velocity of the flowing fluid.

The drawings accompanying this specification represent, in Figure 1, a vertical section, and Figs. 2 and 3, horizontal sections, the latter looking upward.

In these drawings, A denotes an upright cylindrical hollow vessel, of a strength capable of resisting an internal pressure corresponding to the service to which it is to be put—as, for instance, in connection with a water-meter, to prevent access of sediment to the interior of such meter—and provided at top and bottom with a man-hole or trap, B or C, the former being to permit the removal of substances floating upon the water in the vessel, and the lower opening, C, being to facilitate removal of sedimentary deposits which are precipitated to the bottom of the vessel by the action of gravitation.

The interior of the vessel A is, in the present instance, practically divided into three portions or divisions—a central one, D, into which the fluid is first admitted and the eddy produced, an upper one, E, which receives the fluid after leaving the central inclosure, and in which floating substances are arrested, and a lower one or pot, F, in which the sediment deposits itself by gravitation.

The inlet orifice or port of the instrument is shown at *a*, and connects with a suitable supply of liquid under pressure, such port communicating with an annular passage or conduit, F', arranged at the upper part of said chamber, and being divided to flow through both sides of such passage by a partition, G, located in the center of the said port *a*. (See Fig. 2.) The two currents of fluid flowing through the conduit F' are brought together again upon the opposite side of the chamber by a passage, *b*, in said conduit, and the entire current is discharged into a hood or guard, *c*, which surrounds such opening and is open at bottom, as shown at *d*, the converging currents having the effect of producing an eddy within and immediately below the hood, while at the same time the fluid entering the enlarged area of the chamber is expanded greatly in volume and diminished correspondingly in pressure and velocity, the result being that the sediment held in solution by the liquid is by the conjoint action of the eddy and the reduction in velocity precipitated to the bottom of the structure, which is the chamber or pot F before named. As the sediment accumulates in the pot F it may be removed by way of the man-hole C. The fluid, after coursing through the hood and the central chamber, rises into the upper chamber, E, about and over the exterior of the hood, and escapes from the latter through the outlet-port, which is shown at *e* as leading from the lower part of said chamber E.

To intercept within the upper portion, E, of the structure such floating débris, together with fish and other living objects, as may find their way to the interior of such structure, and thereby prevent clogging or obstruction of the outlet-port, I extend across the inclosure E, and in front of said outlet, but at some distance therefrom to avoid risk of clogging said outlet, a screen, *f*, of any suitable construction, and this screen may, if desirable, be extended downward through the central inclosure, D, outside of the hood *c*, to arrest a portion of said débris at the lower part of said central inclosure.

To aid the passage of water upward after leaving the hood *c*, wings *h h* may be secured to opposite sides of such hood, and extending downward to the bottom of the central inclosure. (See Fig. 3.) This bottom is shown at *i* as having a central opening, *j*, to permit of descent of sedimentary deposit into the pot F.

The increased capacity of the vessel A over the original fluid-supply entering it by way of the inlet-port reduces the fluid in transit through the vessel to a sluggish stream, which affords time for the precipitation of the sediment held in solution, while the outlet of the vessel, being contracted to the size of the inlet, or practically so, tends to restore the pressure to the fluid as it leaves the vessel.

I claim—

1. In a sedimentary trap for purifying liquids, the combination of the middle chamber, into which the liquid is first admitted and the eddy produced in the manner herein set forth, the bottom of said chamber being provided with a central opening to permit the descent of sedimentary deposit into the lower chamber, where the said deposit collects, substantially as set forth.

2. The combination of hood *c* with the chamber D, partition G', conduit F', lower chamber, F, and the inlet and outlet, substantially as set forth.

3. The combination, with the vessel A, of the inlet and outlet ports *a* and *b*, and the hood arranged to receive the inflowing current and divert it into the lower part of the vessel prior to its passage to the outlet-port, substantially as stated.

4. Hood *c*, in combination with wings *h h*, sedimentary chamber F, having top opening, *j*, middle chamber, D, and upper chamber, E, substantially as set forth.

5. The filter *f*, supported at a distance from the outlet, in combination with the middle chamber, which first receives the current, the lower chamber, where the deposit collects, and the upper chamber, where said filter is located, substantially as set forth.

In testimony whereof I affix my signature in presence of two witnesses.

BENJ. F. NOURSE.

Witnesses:
G. W. B. POLLEY,
R. GAVELL.